United States Patent [19]

Mahar

[11] Patent Number: 4,532,177
[45] Date of Patent: Jul. 30, 1985

[54] BASE COAT COMPOSITIONS FOR WET-ON-WET APPLICATIONS, AND ARTICLES COATED THEREWITH

[75] Inventor: Ralph W. Mahar, Southport, England

[73] Assignee: Eastman Kodak Company, Rochester, N.Y.

[21] Appl. No.: 635,777

[22] Filed: Jul. 30, 1984

[30] Foreign Application Priority Data

Apr. 2, 1984 [GB] United Kingdom ............... 8408450

[51] Int. Cl.$^3$ .................... C08K 3/08; C08L 1/14; C08L 67/02; C08L 91/08
[52] U.S. Cl. ................. 428/328; 428/423.3; 428/423.7; 428/425.1; 428/424.2; 428/480; 428/483; 428/508; 428/532; 524/38; 524/39; 524/40; 524/483; 524/437
[58] Field of Search .................... 524/39, 40, 41, 38, 524/483; 428/423.3, 423.7, 424.2, 425.1, 421, 480, 483, 328, 508, 532

[56] References Cited

U.S. PATENT DOCUMENTS

| | | | |
|---|---|---|---|
| 4,007,144 | 2/1977 | Sanders et al. | 524/39 |
| 4,027,066 | 5/1977 | Victorius | 524/39 |
| 4,407,990 | 10/1983 | Hall et al. | 524/40 |
| 4,451,597 | 5/1984 | Victorius | 524/39 |

OTHER PUBLICATIONS

Miall, "A New Dictionary of Chemistry" Interscience Publishers, Inc., New York, 1961, pp. 20 & 437.

*Primary Examiner*—Allan M. Lieberman
*Attorney, Agent, or Firm*—Donald W. Spurrell; J. Frederick Thomsen

[57] ABSTRACT

Base coat compositions comprise a film-forming resin component selected from one or a mixture of any of alkyd, polyester, acrylic and polyurethane resins, having blended therewith from 1.0 to 15.0% by weight of pigment and from 2.0% to 50.0% by weight of cellulose ester material having the following chemical characteristics:

Solution viscosity, seconds—0.05–0.005
Acetyl, % by wt.—10.0–15.00
Propionyl, % by wt.—0.1–0.8
Butyryl, % by wt.—36.0–40.0
Free-Hydroxyl, % by wt.—1.0–2.0

The compositions when containing pigment such as metallic particles are particularly useful in wet-on-wet automotive finish applications, allowing minimal metallic particle reorientation upon the application thereto of polymeric top coats (particularly those containing solvent), and a considerable increase in solids content.

6 Claims, No Drawings

BASE COAT COMPOSITIONS FOR WET-ON-WET APPLICATIONS, AND ARTICLES COATED THEREWITH

This invention concerns novel base coat compositions containing pigment such as metallic particles, and which are particularly useful in wet-on-wet automotive finish applications. These compositions exhibit greatly reduced dissolution (minimal metallic particle reorientation) upon the application thereto of polymeric top coats, particularly those containing solvent, which property enhances finish appearance such as brightness. The present compositions also allow a considerable increase in solids content, i.e., normally solid resins, wax modifiers, cross-linking agents, metallic particles, or the like. Such high solids are very desirable in reducing the solvent requirements and minimizing solvent recovery and/or solvent disposal problems.

The present base coat compositions comprise very low viscosity cellulose acetate butyrate (CAB) blended with pigment, particularly metallic particles, and with any of a variety of curable resins, with or without modifiers such as natural or synthetic waxes or the like. The present compositions are defined as comprising a film-forming resin component selected from one or a mixture of any of alkyd, polyester, acrylic and polyuretheane resins, having blended therewith from about 1.0 to about 15.0% by weight of pigment and from about 2.0% to about 50.0% by weight of cellulose ester material having the following chemical characteristics:

Solution Viscosity, seconds—0.05–0.005
Acetyl, % by wt.—10.0–15.0
Propionyl, % by wt.—0.1–0.8
Butyryl, % by wt.—36.0–40.0
Free Hydroxyl, % by wt.—1.0–2.0

Preferred such compositions are wherein the resin component is prepared from at least one of neopentyl glycol, trimethylolpropane, 2,2,4-trimethyl-1,3-pentanediol, or ethylene glycol, and at least one of isophthalic acid, adipic acid, trimellitic anhydride, terephthalic acid, or 1,4-dimethylcyclohexanedicarboxylic acid. In the wet-on-wet applications, the composite base and top coat layers may be stoved or heat cured simultaneously as in automotive finish, baking operations.

The curable resins include polyesters, polyurethanes, polycarbonates, acrylics, and the like which are well known to the art as disclosed for example in greater detail in U.S. Pat. Nos. 3,639,147 and 4,315,053, the disclosures of which are incorporated herein by reference. Some specific polyester resins useful herein, and their manufacture are as described below wherein, unless otherwise stated, the molecular weights are number average (Mn), the quoted terms are trademarks, the acid numbers are determined by ASTM D974-80, the Gardner-Holdt viscosities by ASTM D-1545-63, and the hydroxyl numbers as follows:

The sample is dissolved in toluene and then reacted with excess acetyl chloride using pyridine as a catalyst. After hydrolyzing the excess reagent with water, the solution is titrated volumetrically with NaOH to a phenolphthalein endpoint. The difference between the sample titration and a blank is used to calculate the hydroxyl number.

EXAMPLE 1

| Reactants | Moles |
|---|---|
| *"NPG Glycol" | 12.83 |
| Trimethylolpropane (TMP) | 1.43 |
| Isophthalic Acid | 6.12 |
| Adipic Acid | 6.12 |

*Names in quotation marks are trade marks.

Preparation

1. Purge the reactor with $N_2$ and charge reactants. Begin upheat to cook temperature at 2° C./minute.
2. While maintaining inert gas purge ($N_2$ at 0.4 SCFH), process at 220°–230° C. and hold until an acid number of 5–10 is obtained at a Gardner-Holtd viscosity of $Z_2$–$Z_3$ (80% nonvolatiles in xylene).
3. Maintain inert gas purging while cooling to 120° C. and add solvent.

RESIN PROPERTIES

Acid Number (AN)—5–10
Molecular Weight—1400–1600
Solvent—Xylene
Gardner-Holdt Viscosity—$Z_2$–$Z_3$
Hydroxyl Number—90–100
Nonvolatiles, wt %—80
Gardner Color—<1

EXAMPLE 2

| Reactants | Composition Equivalents |
|---|---|
| 1st Stage | |
| Trimethylolpropane (TMP) and | 12.86 |
| "Pamolyn" 200 (P-200) Fatty Acid | 3.84 |
| 2nd Stage | |
| Isophthalic Acid (IPA) and | 13.19 |
| NPG Glycol | 9.37 |
| 3rd Stage | |
| Trimellitic Anhydride (TMA) | 1.55 |
| Catalyst: 3.0 grams "Fascat" 4102 Catalyst. | |
| Nitrogen Flow: Sufficient to maintain an oxygen level of less than 1% | |

Preparation

1. Purge with nitrogen and charge TMP, P-200, and catalyst to a 5-liter flask equipped with a heating mantle, agitator, temperature probe, partial condenser, water trap, and total condenser. Increase temperature to a maximum of 220° C. and maintain until an acid number (AN) of <5 is reached.
2. Add IPA and NPG Glycol and cook at 200°–220° C. until AN of <10 is reached.
3. Add TMA. Cook at a maximum of 220° C. until an AN of <8 and a Gardner-Holdt viscosity of Z-$Z_1$ at 75% solids in methyl n-propyl ketone is obtained. Remove heat, let cool to 100° C. and add solvent.

RESIN PROPERTIES

Acid Number—8
Hydroxyl Number—68–76
Molecular Weight—1700–1900
ICI 150° C. Viscosity, Neat, poise—7–10
Nonvolatiles, wt %—75
Solvent—Methyl n-propyl ketone Gardner-Holdt Viscosity—Z-$Z_2$
Gardner Color—5-8
Density, lb/gal (kg/L)—8.44 (1.01)

EXAMPLE 3

| Reactants | | Moles |
|---|---|---|
| 1st Stage | | |
| NPG Glycol | | 12.17 |
| Trimethylolpropane (TMP) | | 1.35 |
| Dimethylcyclohexanedimethanol (DMCD) | | 5.82 |
| 2nd Stage | | |
| Isophthalic Acid (IPA) | | 5.52 |
| Catalyst: | 0.2% Fascat 4100 Based on Total Charge | |
| Stabilizer: | 0.1% p-Toluenesulfonic Acid Based on Total Charge | |
| Nitrogen Flow: | 0.4 SCFH | |

Preparation

1. Purge the reactor and charge the first-stage reactants, catalyst, and stabilizer. Begin upheat to 190° C. at 1° C./minute. Hold for 2-3 hours until a minimum of 95% of the methanol is recovered.
2. While maintaining the inert gas purge, cool to 150° C. and add the IPA. Heat to 220° C.
3. Process at 220° C. until an acid number of 10-15, and a Gardner viscosity of $Z_4$-$Z_6$ (at 80% NV. in xylene) is obtained.
4. Cool to 120° C. and add solvent.

RESIN PROPERTIES

Hydroxyl Number—90-110
Molecular Weight—1200-1500
Gardner Color—1-2
Appearance—Clear-Slight Haze
Solvent—Xylene

EXAMPLE 4

| Reactants | Moles |
|---|---|
| "TMPD Glycol" | 12.23 |
| Trimethylolpropane (TMP) | 1.17 |
| Isophthalic Acid (IPA) | 4.64 |
| Adipic Acid | 4.64 |
| Catalyst: 6.7 grams Butyl Stannoic Acid | |
| Nitrogen Flow: 0.4 SCFH | |

Preparation

1. Charge TMPD glycol, TMP, IPA, adipic acid, and catalyst to a five-liter flask equipped with a heating mantle, agitator, nitrogen sparge, temperature probe, partial condenser, water trap, and total condenser.
2. Increase temperature to 200° C. and hold for about 3 hours. Increase temperature to maximum of 210° C. and hold for a final acid number of 6±2 and a Gardner-Holdt viscosity of Z-$Z_2$ at 85 wt. % theoretical nonvolatiles in xylene.
3. Remove heat, allow to cool to 143° C. and add solvent.

RESIN PROPERTIES

Acid Number—4-8
Hydroxyl Number—170
Molecular Weight—800-1000
Gardner-Holdt Viscosity—Z-$Z_2$
Gardner Color—2-4
Nonvolatiles, wt. %—85
Solvent—Xylene
Density, lb/gal (kg/L)—8.74 (1.05)

EXAMPLE 5

| | Reactants | Moles |
|---|---|---|
| 1st Stage | NPG Glycol | 12.57 |
| | Trimethylolpropane | 2.22 |
| | DMCD | 5.23 |
| 2nd Stage | Isophthalic Acid (IPA-85) | 5.23 |
| Catalyst: | 0.1% Fascat 4100 Based on Total Charge | |
| Stabilizer: | 0.1% p-Toluenesulfonic Acid Based on Total Charge | |
| Nitrogen Flow: | 0.4 SCFH | |

Preparation

1. Charge NPG glycol, TMP, DMCD, catalyst and stabilizer to a five-liter flask equipped with a heating mantle, agitator, nitrogen sparge, temperature probe, partial condenser, water trap, and total condenser.
2. Increase temperature to a maximum of 190° C. and hold for 2-3 hours. Increase temperature to 220° C. and hold until first-stage reaction stops with approximately 95% of the theoretical methanol, 319 grams (402 ml), collected from the total condenser.
3. Cool to 150° C. and add IPA-85. Increase temperature to 220° C. and hold for an acid number of 11+3 and an ICI viscosity of 10±3 poise at 125° C. or a Gardner viscosity of $Z_3$-$Z_5$ at 80 wt. % theoretical nonvolatiles in xylene.
4. Remove heat. Let cool to 143° C. (290° F.) and add solvent.

RESIN PROPERTIES

Acid Number—8-14
Hydroxyl Number—165-185
Molecular Weight—900-1100
Gardner-Holdt Viscosity—$Z_3$-$Z_5$
Gardner Color—1
Nonvolatiles, wt %—80
Solvent—Xylene
Density, lb/gal (kg/L)—9.04 (1.08)
Appearance—Clear-Slightly Hazy

EXAMPLE 6

| Reactants | Moles |
|---|---|
| NPG Glycol | 2.84 |
| Ethylene Glycol | 1.89 |
| Isophthalic Acid-99 | 2.59 |
| Terephthalic Acid-22 | 1.92 |
| Add to Reactor Charge: | |
| Catalyst - 0.2 wt % Dibutyltin Oxide (On Total Charge) | |
| Reflux Solvent - 3.0 wt % n-Butyl Acetate (On Yield) | |
| Nitrogen Flow - 0.2 L/minute (0.42 ft³/hr) | |

| Preparation | |
|---|---|
| Up-Heat Rate, degree/min, from R/T to 180° C. | 3 |
| from 180° C. to 230° C. | |
| Reaction time, hours at 230° C. | 0.3 |
| Final Acid Value, determined on resin solids | 3-6 |
| Molecular Weight, vapor pressure osmometry | 3000-3500 |

| -continued |  |
|---|---|
| Preparation |  |
| Suggested Dilution, % non-volatiles | 60 |
| Gardner Color, 60% NV | <1 |
| Weight/Volume, 24° C. (75° F.), lb/U.S. gal (60% in toluene) | 8.9 |
| (kg/liter (60% in Toluene) | 1.066 |

VISCOSITY OF RESIN AT 60% NV WITH VARIOUS SOLVENTS

| Solvent | Brookfield Viscosity, cP | Gardner Viscosity |
|---|---|---|
| Methyl Ethyl Ketone | 180 | E |
| Toluene | 700 | R-S |
| Toluene/Isopropanol (70/30) | 690 | R |
| "EKTASOLVE" EE Acetate | 2,300 | X-Y |

The various sources of cellulosic materials used to make the cellulose esters which are employed in the present invention include cotton and wood pulp. A discussion of cellulose is found in High Polymers, Vol. 5. Chapters 1-3 of Emil Ott, Harold M. Spurlin and Mildred W. Grafflin Interscience Publishers, 1954, Second Edition, wherein it is specifically defined as comprising at least 700 anhydroglucose units, specifically anhydroglucosepyranose units.

A typical preparation of cellulose acetate butyrate (CAB) involves slurrying acetylation grade wood pulp in water for activation, and centrifuging to give a water/cellulose weight proportion of from about 1/2 to 5/1. Other proportions can, of course, be employed, as well as the undried mill cellulose. The wet cellulose is then dewatered by suitable means such as replacement by butyric acid. This step is preferred since water would impede the subsequent esterification by reaction with the acid anhydride.

The dewatered cellulose is then charged to an esterification mixer, preferably provided with cooling means to prevent uncontrolled cellulose degradation during esterification. Butyric and acetic anhydrides, preferably cold, in excess are added to the acylation mixer along with sulfuric acid catalyst. The esterification reaction is initiated by addition of the sulfuric acid catalyst, preferably last, or by addition of all reactants at the same time. The temperature is preferably kept below about 150° F. Reaction time for essentially complete esterification depends on reaction conditions including reactant concentrations. From about 4 to about 6 hours would be considered an adequate reaction time.

The hydrolysis may be carried out by known methods including either acid or basic hydrolysis. A preferred acid hydrolysis involves the use of sulfuric acid catalyst in aqueous acetic and butyric acids (90 percent acid) to prevent ester precipitation, in an agitated vessel at temperatures not exceeding about 200° F. The hydrolysis must be carefully regulated to give typically, a butyryl content of from about 36 to about 38% by weight, and an acetyl content of from about 12 to about 15% by weight, the acyl contents being determined by ASTM D817 (1983), Sec. 21-28, and a free-hydroxyl content of from about 1.0 to about 2.0 percent by weight determined by ASTM D817 (1983), Sec. 29-34. A small amount of propionyl may also be present. A hydrolysis time of from about 18 to about 24 hours has been found adequate at temperatures of from about 125° F. to about 200° F. The hydrolysis time required as known to those skilled in the art, however, is dependent upon such factors as temperature, acid concentration, sulfuric acid catalyst concentration, and the like.

The solution viscosity of these cellulose ester (CAB) compositions can vary between about 0.005 and about 0.05 seconds, but preferably between about 0.01 to abot 0.03 seconds, and is determined by the molecular weight change during esterification according to ASTM D817 (1983), Sec. 57-58. The desired viscosity is obtained by regulation of reaction temperature, reaction time, and catalyst concentration, the higher the temperature and catalyst concentration, the lower the viscosity, as is well known in the art. These cellulose esters can be employed in concentrations of from about 2.0 to about 50.0 wt. % of the total base coat solids, and preferably from about 4.0 to about 20.0 wt. %. The term "solids" includes all ingredients except solvents, and all weight percentages of ingredients or reactants in the examples and appended claims are based on total solids weight of the base coat composition.

A typical wet-on-wet base coat formulation in parts by weight using a CAB of very low viscosity (A) according to the present invention is shown in table II below along with an intermediate and a normal solids base coat which uses CAB (B) and CAB (C) respectively, said cellulose esters having the following compositions and properties shown in Table 1 as determined by the above ASTM measurements:

TABLE I

|  | CAB (A) | CAB (B) | CAB (C) |
|---|---|---|---|
| Solution Viscosity | 0.01 | 0.01 | 2.0 |
| Acetyl | 12.4 | 1.5 | 12.9 |
| Propionyl | 0.4 | 0.5 | 0.5 |
| Butyryl | 38.1 | 53.0 | 38.3 |
| Free-Hydroxyl | 1.6 | 1.72 | 1.46 |

TABLE II

|  | (Parts by weight) | | |
|---|---|---|---|
|  | Normal | Intermediate | Higher Solids |
| Resin[a] | 30 | 30 | 30 |
| (C) | 20 | — | — |
| (B) | — | 20 | — |
| (A) | — | — | 20 |
| "Maprenal" MF 590 (55%)[b] | 11 | 11 | 11 |
| "Epolene", C-16 wax (5%)[c] | 125 | 125 | 125 |
| Sparkle Silver 5000AR Aluminum Flake (65%)[d] | 15 | 15 | 15 |
| Butyl Acetate | 300 | 150 | 150 |
| Butyl Acetate/Xylene (70/30) | 110 | 15 | 15 |
| Viscosity Ford Cup No. 4 | 16s | 16s | 15s |
| Calculated Solids @ Spray Viscosity | 11% | 18% | 21% |

[a]High solids resin described above in resin Example 3, 80% in n-butanol.
[b]"Melamine", cross-linking agent (Hoechst), 55% in n-butanol.
[c]Chemically modified wax, 5% in xylene.
[d]Silberline, aluminum flake, 65% in xylene.

The useful top coat materials include the alkyd resins wherein it is preferred that the oil or fatty acid portion thereof contain a light colored baking oil or fatty acid. Furthermore when these resins are used as topcoats they can be reacted with various acrylic or ethylenically unsaturated monomers to produce vinyl modified alkyd resins in known manner.

Curing of these alkyd resins can be accomplished by blending with any of the previously described cross-linking agents in the same weight ratios as are used with carboxy-hydroxy copolymers.

Included among the various fatty acids and oils useful in preparing these alkyd resins are the fatty acids derived from the following oils; castor, dehydrated castor, cocoanut, corn, cottonseed, linseed, oticica, perilla, poppyseed, safflower, soybean, and tung oil, and the various rosins containing tall oil fatty acids. Useful polyols include the various glycols, such as ethylene glycol, propylene glycol, neopentyl glycol, butylene glycol, 1,4-butanediol, hexylene glycol, 1,6-hexanediol, the polyglycols such as diethylene glycol or triethylene glycol, etc.; the triols such as glycerine, trimethylol ethane, trimethylol propane, etc., and other higher functional alcohols such as pentaerythritol, sorbitol, mannitol, and the like. Acids useful in preparing the alkyd resins of this invention include monofunctional acids such as rosin acids, benzoic acid, para-tertiary butyl benzoic acid and the like, and the polyfunctional acids such as, adipic acid, azelaic acid, sebacic acid, phthalic acid, phthalic anhydride, isophthalic acid, terephthalic acid, dimerized and polymerized fatty acids, trimellitic acid, and the like.

Other lacquers besides the alkyd resins useful in base and top coats also contain poly(meth)acrylates or their copolymers. Occasionally the alkyd resins may also be replaced entirely by such poly(meth)acrylates or copolymers. They are obtained by copolymerizing (meth)acrylic acid esters of monovalent alcohols with (meth)acrylic acid esters containing functional hydroxyl groups. They may also contain other comonomers such as styrene, vinyl toluol, vinyl ester and also small amounts of monomers containing carboxyl groups polymerized therein. These acrylate resins also are used in combination with aminoplast resins in organic solvents.

EXAMPLE 7

| TYPICAL TOP COAT FORMULATION | |
|---|---|
| "Setalux" C-1388 VV60[a] | 352 |
| "Setamine" VS-138 BB70[b] | 130 |
| "Tinuvin" 900[c] | 3 |
| "Tinuvin" 292[d] | 3 |
| "Solvesso" 100/Xylene (1:3) | 435 |
| Spray Viscosity, Ford Cup No. 4 | 16s |

[a]Synthese, Acrylic Resin, 60% in Solvesso 100
[b]Synthese, Melamine Resin, 70% in n-butanol
[c]CIBA-GEIGY, UV Absorber
[d]CIBA-GEIGY, HALS, hindered amine stabiliser In the present invention, the substrates may consist of various materials, e.g., metal, plastic or glass. The invention is particularly directed however to auto bodies which may be untreated or pretreated by phosphatizing, chromatizing, or coated with a primer, putty, or filler.

The pigments useful in the present invention are organic, inorganic, and metallic coloring pigments, such as titanium dioxide, iron oxide, chrome yellow, chrome green, cadmium pigments, phthalocyanine blue, phthalocyanine green, and may also include silica, kaolin, talc, barium sulphate, chalk, and the like as fillers and modifiers. The metal pigments are aluminum, copper or other metals in the form of powder or flakes. These pigments may be used in amounts of from about 1 to about 15% by weight of the total base coat solids.

EVALUATION

Both the intermediate and higher solids base coats were applied identically in two layers with a spray pressure of 4½, 60 psi. The first base coat was applied at about 7 μm thickness and a sufficient time was then allowed for the solvent to evaporate before the second coat was applied at approximately the same thickness. The top coat enamel of Example 7 was then applied, also in two coats of a total thickness of 35–40 μm, however during this application one half of the panel was screened off so that an assessment could be made between the base coat with and without top coat enamel.

The panels were then stoved identically at 135° C., metal temperature for 30 minutes. After stoving, it was possible to measure the base coat thickness and the total base and top combined thickness and to make an assessment of brightness of base coat alone and base coat coated with top coat enamel and to assess for the effect of redissolving of the base coat by the top coat. It was found that the degree of redissolving was very slight using the cellulose ester (A), when compared to that caused by the use of cellulose ester (B).

The invention has been described in detail with particular reference to preferred embodiments thereof, but it will be understood that variations and modifications can be effected within the spirit and scope of the invention.

I claim:

1. A base coat composition comprising a film-forming, curable resin component selected from one or a mixture of any of polyester, acrylic and polyurethane resins, having blended therewith from 1.0 to 15.0% by weight of pigment and from 2.0% to 50.0% by weight of cellulose ester material having the following chemical characteristics:

Solution Viscosity, seconds—0.05–0.005
Acetyl, % by wt.—10.0–15.0
Propionyl, % by wt.—0.1–0.8
Butyryl, % by wt. 36.0—40.0
Free-Hydroxyl, % by wt.—1.0–2.0.

2. The composition of claim 1 wherein the resin component is prepared from at least one of neopentyl glycol, trimethylolpropane, 2,2,4-trimethyl-1,3-pentanediol, or ethylene glycol, and at least one of isophthalic acid, adipic acid, trimellitic anhydride, terephthalic acid, or 1,4-dimethylcyclohexanedicarboxylic acid.

3. The composition of claim 2 containing from 2 to 10% by weight of a cross-linking agent, and from 2 to 20% by weight of aluminum flake.

4. The composition of claim 3 wherein the resin is prepared from neopentyl glycol, trimethylolpropane, 1,4-dimethylcyclohexanedicarboxylic acid, and isophthalic acid in a respective mole ratio of said reactants of 9–15/0.5–4.0/2.5–8.0/2.5–8.0, and the concentration of the cellulose ester material is from 4.0 to 20.0% by weight, and the composition has blended therewith from 50–70% by weight of polyethylene wax having a molecular weight of from 4,000 to 10,000.

5. The composition of any of claims 1-4 wherein the cellulose ester material has a solution viscosity of from 0.01 to 0.03 second.

6. A substrate having a multilayer coating composition adhered hereto, said composition comprising:
A. a dried nonaqueous base film of the composition of any of claims 1-4; and
B. a baked transparent coating composition deposited on said base film and comprising a film-forming material selected from polyester resins and polyurethane resins.

* * * * *